(12) United States Patent
Sötemann

(10) Patent No.: US 9,725,576 B2
(45) Date of Patent: Aug. 8, 2017

(54) PROCESS FOR MANUFACTURING WHITE PIGMENT CONTAINING PRODUCTS

(71) Applicant: Omya International AG, Oftringen (CH)

(72) Inventor: Jörg Sötemann, Villach (AT)

(73) Assignee: Omya International AG, Oftringen (CH)

( * ) Notice: Subject to any disclaimer, the term of this patent is extended or adjusted under 35 U.S.C. 154(b) by 169 days.

(21) Appl. No.: 14/414,967

(22) PCT Filed: Aug. 8, 2013

(86) PCT No.: PCT/EP2013/066666
§ 371 (c)(1),
(2) Date: Jan. 15, 2015

(87) PCT Pub. No.: WO2014/029634
PCT Pub. Date: Feb. 27, 2014

(65) Prior Publication Data
US 2015/0175775 A1   Jun. 25, 2015

Related U.S. Application Data

(60) Provisional application No. 61/693,350, filed on Aug. 27, 2012.

(30) Foreign Application Priority Data

Aug. 20, 2012   (EP) .................................... 12181089

(51) Int. Cl.
| | |
|---|---|
| *C08K 5/20* | (2006.01) |
| *C09C 1/02* | (2006.01) |
| *B03D 1/01* | (2006.01) |
| *B03D 1/004* | (2006.01) |
| *C04B 14/28* | (2006.01) |
| *C04B 16/00* | (2006.01) |
| *C08K 3/26* | (2006.01) |
| *C08K 5/17* | (2006.01) |
| *D21H 17/00* | (2006.01) |

(52) U.S. Cl.
CPC .............. *C08K 5/20* (2013.01); *B03D 1/0043* (2013.01); *B03D 1/01* (2013.01); *C04B 14/28* (2013.01); *C04B 16/00* (2013.01); *C08K 3/26* (2013.01); *C08K 5/17* (2013.01); *C09C 1/02* (2013.01); *C09C 1/021* (2013.01); *D21H 17/74* (2013.01); *B03D 2201/02* (2013.01); *B03D 2203/005* (2013.01); *C01P 2004/51* (2013.01); *C01P 2004/61* (2013.01); *C01P 2006/12* (2013.01); *C01P 2006/60* (2013.01); *C01P 2006/80* (2013.01); *C08K 2003/265* (2013.01)

(58) Field of Classification Search
CPC ........ D21H 17/74; B03D 1/0043; B03D 1/01; B03D 2203/005; B03D 2201/02; C09C 1/02; C09C 1/021; C04B 14/28; C04B 16/00; C08K 3/26; C08K 5/17; C08K 5/20; C08K 2003/265; C01P 2004/51; C01P 2004/61; C01P 2006/12; C01P 2006/60; C01P 2006/80
See application file for complete search history.

(56) References Cited

U.S. PATENT DOCUMENTS

| | | | |
|---|---|---|---|
| 3,990,966 A | 11/1976 | Stanley et al. | |
| 4,995,965 A | 2/1991 | Mehaffey et al. | |
| 5,261,539 A * | 11/1993 | Hancock ................. | B03D 1/01 209/166 |
| 5,720,873 A * | 2/1998 | Klingberg ............ | B03D 1/0043 209/166 |
| 8,381,915 B2 * | 2/2013 | Tavakkoli ............... | B03D 1/01 209/166 |
| 8,662,311 B2 * | 3/2014 | Gane ........................ | B03D 1/01 209/166 |
| 8,992,875 B2 * | 3/2015 | Tavakkoli ............... | C01F 11/18 423/432 |
| 2010/0040528 A1 * | 2/2010 | Tavakkoli ............... | B03D 1/01 423/430 |
| 2014/0048453 A1 * | 2/2014 | Birken .................... | B03D 1/01 209/166 |
| 2014/0048454 A1 * | 2/2014 | Birken .................... | B03D 1/01 209/166 |
| 2015/0183654 A1 * | 7/2015 | Tavakkoli ............... | C01F 11/18 428/402 |
| 2015/0273481 A1 * | 10/2015 | Dilsky ................... | B03D 1/011 209/166 |

FOREIGN PATENT DOCUMENTS

| | | |
|---|---|---|
| CA | 1187212 A1 | 5/1985 |
| EP | 0591633 A1 | 4/1994 |
| EP | 1944088 A1 | 7/2008 |
| EP | 2366456 A1 | 9/2011 |
| WO | 2007122148 A1 | 11/2007 |
| WO | 2008084391 A1 | 7/2008 |
| WO | WO 2011/113866 A1 * | 9/2011 |

OTHER PUBLICATIONS

The International Search Report, dated Sep. 19, 2013 for PCT Application No. PCT/EP2013/066666.
The Written Opinion of the International Searching Authority, dated Sep. 19, 2013 for PCT Application No. PCT/EP2013/066666.

* cited by examiner

*Primary Examiner* — Anthony J Green
(74) *Attorney, Agent, or Firm* — Amster, Rothstein & Ebenstein LLP

(57) ABSTRACT

The present invention concerns a process for manufacturing white pigment containing products. The white pigment containing products are obtained from at least one white pigment and impurities containing material via froth flotation.

33 Claims, No Drawings

PROCESS FOR MANUFACTURING WHITE PIGMENT CONTAINING PRODUCTS

CROSS-REFERENCE TO RELATED APPLICATIONS

This application is a U.S. national phase of PCT Application No. PCT/EP2013/066666, filed Aug. 8, 2013, which claims priority to European Application No. 12181108.9, filed Aug. 20, 2012 and U.S. Provisional Application No. 61/693,350, filed Aug. 27, 2012.

The present invention relates to a process for manufacturing white pigment containing products and, more particularly, relates to the field of technologies implemented in order to separate white pigments and impurities by froth flotation for the manufacture of white pigment containing products.

Pigments are generally known as materials that change the color of reflected or transmitted light as the result of wavelength-selective absorption. This physical process differs from fluorescence, phosphorescence, and other forms of luminescence, in which a material emits light. Pigments are used for coloring e.g. paint, ink, plastic, fabric, cosmetics, food and other materials. Most pigments used are dry colorants, usually ground into a fine powder.

White pigments take a special position in the field of pigments due to their industrial relevance. For example, in paper industries in Europe more than 10 million tons per year of white pigments are used. White pigments are also used in paints and coatings. Especially when manufacturing dispersion paints, white pigments are the base color in the tinting system.

White pigments occur naturally and are obtained by mining. However, generally white pigments contain impurities which induce discoloration such as, for example, greyness or yellowness of the white pigments. Furthermore, these impurities may affect the properties of the white pigments and, thus, lead to significant disadvantages of the white pigments. A high amount of impurities such as, for example, silicates within the white pigments might increase the abrasion. Therefore, the impurities and the white pigments have to be separated from one another to obtain a white pigment containing product that is not, or merely marginally, contaminated with impurities.

It is known in the prior art to separate impurities from white minerals by physico-chemical separation. The physico-chemical separation process involves firstly grounding the metamorphic or sedimentary rock and then subjecting the resulting white pigment and impurities containing material to conventional froth flotation in an aqueous environment. Conventional froth flotation is a highly versatile method known in the prior art for physico-chemical separating particles based on differences in the ability of gas bubbles to selectively adhere to specific surfaces in an aqueous suspension containing the white pigment and impurities containing material. The white pigments with attached air bubbles are then carried to the surface and are removed, while the impurities that remain completely wetted stay in the liquid phase.

As set out above, the basis of conventional froth flotation is the difference in the wettabilities of the white pigments and the impurities. White pigments can either be naturally hydrophobic, but in general the hydrophobicity is induced by chemical treatments. Chemical treatments to render a surface hydrophobic are essentially methods for coating a particle surface with a layer of suitable compounds.

However, conventional flotation has a significant disadvantage: As mentioned before, chemical treatments as collector agents are used to render the surface of the white pigments hydrophobic to separate these particles by gas bubbling. These collector agents are adsorbed on the surface of the white pigments and, therefore, modify the properties of the pigments. However, this modification may be undesirable in the following use of the white pigments in paper, paint or cosmetics. Furthermore, the direct flotation of the desired white pigments is disadvantageous due to quality and economical reasons.

Alternatively, one may consider to use reverse/indirect froth flotation to separate the white pigments and the impurities. In contrast to conventional flotation, in which the desirable white pigments are directly floated and collected from the produced froth, reverse (indirect) flotation aims to have the undesirable impurities preferentially floated and removed, leaving behind a suspension that has been concentrated in the desirable white pigments. Also during reverse flotation collector agents are used that render the impurities hydrophobic.

Corresponding methods that use collector agents in reverse froth flotation are suggested in U.S. Pat. No. 3,990,966, CA 1 187 212 or WO 2008/084391. However, the prior art methods for manufacturing products by reverse froth flotation have numerous disadvantages. For example, many collector agents are formed from compounds that have high melting points and, therefore, these compounds must be dispersed in water using a high energy blender and/or heating, and then must be actively mixed so as to remain in suspension. Thus, the use of such collector agents is very expensive. Additionally, many of the known collector agents cause uncontrolled foaming in the reverse froth flotation process. Furthermore, many of the reverse froth flotation processes are limited in that they are selective, i.e. a significant part of the desired product is floated together with the impurities. Also a great number of the collector agents used so far is considered to be aquatic and environmental toxic.

Therefore, there is a need for an improved method for producing white pigments by flotation, which method avoids or reduces the problems described above in relation to the known methods. Such improved method for manufacturing white pigments from a white pigment and impurities containing material should especially be an easy to handle and ecological method. Also the effectiveness should be satisfactory.

At least some of the foregoing object has been solved by the present invention.

According to one aspect of the present invention a process for manufacturing white pigment containing products is provided, characterised in that said process comprises the following steps:
  a) providing at least one white pigment and impurities containing material
  b) providing at least one collector agent selected from the group consisting of compounds of formula (1)

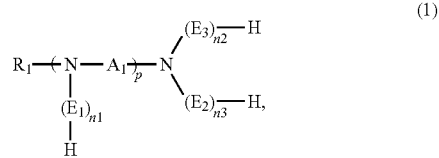

wherein
$R_1$ represents a hydrocarbon group containing from 6 to 30 carbon atoms,
$A_1$ represents an alkylene group having from 1 to 6 carbon atoms,
$E_1$, $E_2$ and $E_3$, are identical or different from each other, each independently chosen from among alkylene oxide groups containing from 1 to 6 carbon atoms,
$n_1$, $n_2$ and $n_3$, are identical or different from each other, each independently chosen from an integer which value is from 1 to 20,
p is 1, 2, 3 or 4,
and compounds of formula (2)

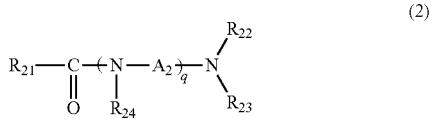

wherein
$R_{21}$ represents a hydrocarbon group containing from 6 to 30 carbon atoms,
$R_{22}$ and $R_{23}$ are identical or different from each other, each independently chosen from among hydrocarbon groups containing from 1 to 6 carbon atoms,
$R_{24}$ represents hydrogen or a hydrocarbon group containing from 1 to 6 carbon atoms,
$A_2$ represents an alkylene group having from 1 to 6 carbon atoms, and
q is 1, 2, 3 or 4
and mixtures thereof
  c) mixing said white pigment and impurities containing material of step a) and said collector agent of step b) in an aqueous environment to form an aqueous suspension
  d) passing gas through the suspension formed in step c)
  e) recovering the white pigment containing product by removing the white pigment bearing phase from the aqueous suspension obtained after step d).

The inventors surprisingly found that the process for manufacturing white pigment containing products from at least one white pigment and impurities containing material and one collector agent selected from the group consisting of compounds of formula (1) and compounds of formula (2) and mixtures thereof

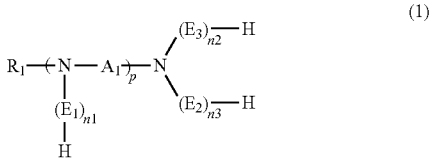

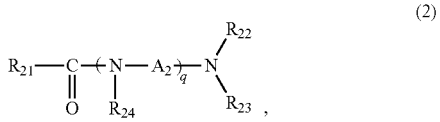

is advantageous because the aforementioned collector agents effectively bind to the surface of the impurities and not to the surface of the white pigments. Therefore, the inventive flotation process is very effective in comparison to known prior art processes. Furthermore, the inventive flotation process is very ecological since the used collector agents are less toxic in comparison to known prior art collector agents. The white pigment containing products obtained from the inventive process show good brightness and have a low yellow index. Additionally, impurities like abrasive silicates can be reduced in a better way by the inventive flotation process than in known prior art processes.

A second aspect of the present invention relates to the use of the white pigment bearing phase obtained by the inventive process in paper, plastics, paint, coatings, concrete, cement, cosmetic, water treatment and/or agriculture applications. The white pigment containing product is preferably used in a wet end process of a paper machine, in cigarette paper, board, and/or coating applications, or as a support for rotogravure and/or offset and/or ink jet printing and/or continuous ink jet printing and/or flexography and/or electrophotography and/or decoration surfaces.

According to a third aspect of the present invention a white pigment containing product obtained by the inventive process is provided.

Advantageous embodiments of the present invention are defined in the corresponding sub-claims.

According to one embodiment, the process involves an indirect flotation step leading to the formation of a froth containing the impurities and a white pigment bearing phase with the white pigment containing product.

According to another embodiment, the white pigment is a white mineral pigment, preferably selected from the group consisting of natural calcium carbonate or ground calcium carbonate, calcium carbonate-containing mineral material, dolomite, barite, aluminium oxide, titanium dioxide and mixtures of the foregoing.

According to another embodiment, the white mineral pigment is an alkaline earth metal carbonate, preferably a calcium carbonate and most preferably ground calcium carbonate (GCC).

According to another embodiment, the white pigment containing material comprises impurities selected from the group consisting of iron sulphides, iron oxides, graphite, silicates and mixtures thereof. The silicate may be selected from the group consisting of quartz, a mica, an amphibolite, an feldspar, a clay mineral and mixtures thereof and preferably is quartz.

According to another embodiment, the silicate is a white coloured silicate selected from the group consisting of wollastonite, kaolin, kaolinitic clay, calcined kaolinitic clay, montmorillonite, talc, diatomaceous earth, sepiolite and mixtures thereof.

According to another embodiment, the amount of white pigment in the white pigment and impurities containing material of step a) is from 0.1 to 99.9 wt.-%, based on the dry weight, preferably from 30 to 99.7 wt.-%, more preferably from 60 to 99.3 wt.-% and most preferably from 80 to 99 wt.-%, based on the dry weight.

According to another embodiment, the amount of white pigment:impurities in the white pigment and impurities containing material of step a) is from 0.1:99.9 to 99.9:0.1, based on the dry weight, preferably from 30:70 to 99.7:0.3, more preferably from 60:40 to 99.3:0.7, and most preferably from 80:20 to 99:1, based on the dry weight.

According to another embodiment, the white pigment and impurities containing material of step a) has a weight median grain diameter in the range of from 1 to 1000 μm, preferably of from 3 to 700 μm, more preferably of from 5 to 500 μm and most preferably of from 10 to 80 μm or from 100 to 400 μm.

According to another embodiment, the compound of formula (1) possesses at least one of the following characteristics:

$R_1$ represents a straight or branched hydrocarbon group containing from 6 to 30 carbon atoms, preferably from 8 to 26, more preferably from 12 to 22 carbon atoms, optionally containing one or more insaturation(s), in the form of double and/or triple bond(s), $A_1$ represents a straight or branched alkylene group having from 1 to 6 carbon atoms, preferably from 2 to 6 carbon atoms, more preferably 2, 3 or 4 carbon atoms, $E_1$, $E_2$ and $E_3$, are identical or different from each other, each independently chosen from among ethylene oxide (OE) group, propylene oxide (OP) group and butylene oxide (OB) group, preferably among OE group and OP group, more preferably each of $E_1$, $E_2$ and $E_3$ represents an OE group, $n_1$, $n_2$ and $n_3$, are identical or different from each other, each independently chosen from an integer which value is from 1 to 20, preferably from 1 to 10, and the sum $n_1+n_2+n_3$ ranges from 3 to 9, p is 1, 2, 3 or 4, preferably 1 or 2, and more preferably p is 1.

According to another embodiment, the compound of formula (2) possesses at least one of the following characteristics:

$R_{22}$ and $R_{23}$ are identical or different from each other, each independently chosen from among hydrocarbon groups containing from 1 to 6 carbon atoms, preferably from 1 to 4 carbon atoms, and more preferably are chosen from among methyl, ethyl, propyl and butyl, $R_{24}$ represents hydrogen, $A_2$ represents an alkylene group having 1, 2, 3 or 4 carbon atoms, and preferably $A_2$ is ethylene or propylene, and more preferably propylene, q is 1 or 2, and preferably 1.

According to another embodiment, the collector agent of step b) consists of one or more compounds of formula (1) or consist of one or more compounds of formula (2).

According to another embodiment, the aqueous suspension obtained in step c) has a pH from 7 to 12, preferably from 7.5 to 11 and more preferably from 8.5 to 9.5.

According to another embodiment, the collecting agent is added in step c) in an amount of from 5 to 5000 ppm based on the total dry weight of the white pigment and impurities containing material of step a), preferably in an amount of from 20 to 2000 ppm, more preferably in an amount of from 30 to 1000 ppm, and most preferably in an amount of from 50 to 800 ppm based on the total dry weight of said white pigment and impurities containing material of step a).

According to another embodiment, the aqueous suspension obtained in step c) has a solids content of between 5 and 80 wt.-% based on the total weight of the solids in the suspension, preferably of between 10 and 70 wt.-%, more preferably of between 20 and 60 wt.-% and most preferably of between 25 and 55 wt.-% based on the total weight of the solids in the suspension.

According to another embodiment, the collecting agent is present in the aqueous suspension obtained in step c) in an amount of from 0.01 to 10 wt.-% based on the total weight of the solids in the suspension, preferably from 0.05 to 5 wt.-%, more preferably from 0.1 to 3.0 wt.-%, and most preferably from 0.2 to 2.0 wt.-%, based on the total weight of the solids in the suspension.

According to another embodiment, one or more additives are added to the aqueous suspension prior to, during or after step c), wherein the additives are selected from the group comprising pH-adjusting agents, solvents, depressants, polyelectrolytes, frothers and collector agents other than the collector agents according to formula (1) or formula (2).

According to another embodiment, the aqueous suspension obtained in step c) is ground during and/or after step c).

According to another embodiment, the gas in step d) is air.

According to another embodiment, the suspension in step d) has a temperature of between 5 and 90° C., preferably between 10 and 70° C., more preferably between 20 and 50° C. and most preferably between 25 and 40° C.

According to another embodiment, the white pigment bearing phase obtained from step e) is dispersed and/or ground before and/or after step e) and preferably is dispersed and/or ground in the presence of at least one dispersing agent and/or at least one grinding aid agent.

According to another embodiment, the white pigment containing product comprises at least 95 wt.-% white pigment, based on the dry weight, preferably of at least 98 wt.-%, more preferably of at least 99 wt.-% and most preferably of at least 99.9 wt.-% based on the dry weight.

A "pigment" in the meaning of the present invention is a solid colouring material having a defined chemical composition and a characteristic crystalline structure.

Pigments can be inorganic pigments. Pigments may be synthetic or natural pigments. Furthermore, pigments are insoluble in water and, thus, resulting in a suspension when contacting them with water.

A "white pigment" in the meaning of the present invention is a pigment that has a white colour.

A "white mineral pigment" in the meaning of the present invention is an inorganic white pigment that may be obtained naturally and specifically includes natural calcium carbonate or ground calcium carbonate (in particular limestone, chalk, marble, calcite), calcium carbonate-containing mineral material (with a 70 wt.-% minimum content of $CaCO_3$, based on the weight of the mineral), dolomite, barite, aluminium oxide, titanium dioxide and mixtures of the foregoing.

An "alkaline earth metal carbonate" in the meaning of the present invention is a carbonate that comprises at least one alkaline earth metal cation. The alkaline earth metals according to the present invention are beryllium $Be^{2+}$, magnesium $Mg^{2+}$, calcium $Ca^{2+}$, strontium $Sr^{2+}$, barium $Ba^{2+}$ and radium $Ra^{2+}$.

"Calcium carbonate" in the meaning of the present invention includes natural calcium carbonate and may be a ground calcium carbonate (GCC).

"Natural calcium carbonate" in the meaning of the present invention is a calcium carbonate (calcite) obtained from natural sources, such as marble, limestone, or chalk.

"Ground calcium carbonate" (GCC) in the meaning of the present invention is a natural calcium carbonate that is processed through a wet and/or dry treatment such as grinding, screening and/or fractionating, for example by a cyclone or classifier.

"Impurities" in the meaning of the present invention are substances that differ from the chemical composition of the desired white pigment.

A "collector agent" in the meaning of the present invention is a chemical compound that is adsorbed by the envisaged particles either by chemisorption or by physisorption. The collector agent renders the surface of the impurities more hydrophobic.

A "gas" in the meaning of the present invention is a substance in a physical state in which it does not resist change of shape and will expand indefinitely. The gas is composed of molecules that are in constant random motion. According to the present invention the compound has to be in a gaseous state at room temperature (20±2° C.) and at standard pressure (101325 Pa or 1.01325 bar).

A "suspension" or "slurry" in the meaning of the present invention comprises insoluble solids and water, and optionally further additives, and usually contains large amounts of solids and, thus, is more viscous and can be of higher density than the liquid from which it is formed.

Throughout the present document, the "weight grain diameter" of a white pigment and impurities containing material is described by its distribution of particle sizes. The value $d_x$ represents the diameter relative to which x % by weight of the particles have diameters less than $d_x$. This means that the $d_{20}$ value is the weight grain diameter at which 20 wt.-% of all particles are smaller, and the $d_{75}$ value is the weight grain diameter at which 75 wt.-% of all particles are smaller. The $d_{50}$ value is thus the "weight median grain diameter", i.e. 50 wt.-% of all grains are bigger or smaller than this particle size. For determining the weight median grain diameter $d_{50}$ value, a Sedigraph 5120 device from the company Micromeritics, USA or a Mastersizer 2000 from Malvern company, GB can be used.

A "specific surface area (SSA)" of a calcium carbonate product in the meaning of the present invention is defined as the surface area of the mineral particle divided by the mass of the mineral particle. As used herein the specific surface area is measured by adsorption using the BET isotherm (ISO 9277:1995) and is specified in $m^2/g$.

A "conventional flotation process" or a "direct flotation process" in the meaning of the present invention is a flotation process in which the desirable white pigments are directly floated and collected from the produced froth leaving behind a suspension containing the impurities.

A "reverse flotation process" or "indirect flotation process" in the meaning of the present invention is a flotation process in which the impurities are directly floated and collected from the produced froth leaving behind a suspension containing the desired white pigments.

The inventive process for manufacturing white pigment containing products involves the provision of at least one "white pigment and impurities containing material" and at least one inventive collector agent. Said white pigment and impurities containing material and said collector agent are mixed in an aqueous environment to form an aqueous suspension. Afterwards or during mixing a gas is passed through the obtained aqueous suspension and the white pigment containing product is recovered by removing the white pigment bearing phase from the aqueous suspension obtained after passing the gas through the suspension.

In the following, details and preferred embodiments of the process for manufacturing white pigment containing products will be set out in more detail. It is to be understood that these embodiments or details apply also for the white pigments containing product obtained by the inventive process and for the inventive use of the white pigment bearing phase also obtained by the inventive process.

The White Pigment and Impurities Containing Material

Step a) of the process of the invention refers to the provision of at least one white pigment and impurities containing mineral.

A white pigment in the meaning of the present invention is a pigment that has a white colour. The white colour of the white pigments is predominately based on the relatively low light absorption in combination with an unselective light scattering of the visual light at the pigments. The white pigments according to the present invention are inorganic white pigments that may be obtained naturally and synthetically and specifically include natural calcium carbonate or ground calcium carbonate (in particular limestone, chalk, marble, calcite), calcium carbonate-containing mineral material (with a 70 wt.-% minimum content of $CaCO_3$, based on the weight of the mineral), dolomite, barite, aluminium oxide, titanium dioxide and mixtures of the foregoing.

White pigments may be white mineral pigments. White mineral pigments in the meaning of the present invention are inorganic white pigments that may be obtained naturally. Beside the above mentioned natural calcium carbonate or ground calcium carbonate (in particular limestone, chalk, marble, calcite), calcium carbonate-containing mineral material (with a 70 wt.-% minimum content of $CaCO_3$, based on the weight of the mineral), dolomite, barite, and mixtures of the foregoing, the white mineral pigments include aluminium oxide $Al_2O_3$ containing minerals, for example $\gamma$-$Al_2O_3$ having a cubic structure and $\alpha$-$Al_2O_3$ having a rhomboedral (trigonal) structure. Additionally, the aluminium oxide containing minerals may comprise other elements such as for example sodium in $Na_2O.11Al_2O_3$, commonly known as diaoyudaoit. Other inventive white mineral pigments are titanium dioxide $TiO_2$ containing minerals, for example rutile, anatase or brookite. Further white mineral pigments are white oxide minerals such as barium sulphate ($BaSO_4$), zinc oxide (ZnO), zirconium dioxide ($ZrO_2$), or tin dioxide ($SnO_2$), or white sulphate minerals and white sulphide minerals such as zinc sulphide (ZnS) or lead carbonate ($PbCO_3$).

Preferably, the white mineral pigment is an alkaline earth metal carbonate.

Alkaline earth metal carbonates in the meaning of the present invention are carbonates that comprise at least one alkaline earth metal cation. The alkaline earth metals according to the present invention are beryllium $Be^{2+}$, magnesium $Mg^{2+}$, calcium $Ca^{2+}$, strontium $Sr^{2+}$, barium $Ba^{2+}$ and radium $Ra^{2+}$ and, preferably, magnesium and calcium. The alkaline earth metal carbonates in the meaning of the present invention are, for example, beryllium carbonate, magnesium carbonate, calcium carbonate, strontium carbonate, barium carbonate or radium carbonate.

According to one embodiment of the present invention, the alkaline earth metal carbonate consist of only one alkaline earth metal, for example, calcium. The alkaline earth metal carbonate may alternatively consist of a mixture of two alkaline earth metals as for example calcium and magnesium and, thus, the alkaline earth metal carbonate may be a calcium magnesium carbonate, e.g., dolomite. The alkaline earth metal carbonate may comprise a mixture of two or more alkaline earth metals.

Additionally, the alkaline earth metal carbonate may comprise further cations as for example sodium in gaylussit (sodium calcium carbonate).

The white pigment may comprise more than one alkaline earth metal carbonate. For example, the white pigment may comprise one magnesium carbonate and one calcium carbonate. Alternatively, the white pigment may consist of only one alkaline earth metal carbonate.

The white pigment may comprise a mixture of two or more white mineral pigments. For example the white pigment may comprise one alkaline earth metal carbonate and an inorganic white pigment that is selected from the group consisting of aluminium dioxide, titanium dioxide, barium sulphate, zinc oxid, zirconium dioxide, or tin dioxide, white sulphate or sulphide minerals.

Preferably, the alkaline earth metal carbonate may be a calcium carbonate.

Calcium carbonate or natural calcium carbonate is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, aluminium oxide etc.

The source of calcium carbonate may be selected from marble, chalk, calcite, dolomite, limestone, or mixtures thereof. Preferably, the source of calcium carbonate may be selected from marble.

Preferably, the alkaline earth metal carbonate may be a ground calcium carbonate (GCC). Ground calcium carbonate (GCC) is understood to be obtained by grinding the calcium carbonate either dry or alternatively wet followed by a subsequent drying step.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill or other such equipment known to the skilled man. In case calcium carbonate containing mineral powder comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be dewatered by well known processes, e.g. by filtration, centrifugation or forced evaporation prior to dewatering. An additional step of drying may be carried out in a single step such as spray drying, or in at least two steps.

Preferably, the white pigment may consist of only one ground calcium carbonate. Alternatively, the white pigment may consist of a mixture of two ground calcium carbonates selected from different sources of ground calcium carbonate. The white pigment may also comprise a mixture of two or more ground calcium carbonates selected from different sources of ground calcium carbonate. For example, the white pigment may comprise one GCC selected from dolomite and one GCC selected from calcite marble. Additionally to the GCC the white pigment may comprise further white mineral pigments.

The white pigment and impurities containing material will contain white pigments as defined above and impurities. Impurities in the meaning of the present invention are substances that differ from the chemical composition of the white pigment and, therefore, are no white pigments.

The impurities to be removed or reduced by the process according to the present invention are compounds that have, for example a grey, black, brown, red, or yellow colour or any other colour affecting the white appearance of the white pigment material. Alternatively, the impurities to be removed or reduced have a white colour but have different physical properties than the white pigments and, therefore, adversely affect the white pigments.

According to a preferred embodiment the starting material, e.g., the white pigment and impurities containing material may comprise impurities selected from iron sulphides.

Iron sulphides or iron sulfides in the meaning of the present invention are understood to be chemical compounds of iron and sulphur comprising a wide range of stochiometric formulae and different crystalline structures. For example the iron sulphide can be iron(II) sulphide FeS (magnetopyrite) or pyrrhotite $Fe_{1-x}S$ wherein x is from 0 to 0.2. The iron sulphide can also be a iron(II) disulphide $FeS_2$ (pyrite or marcasite). The iron sulphides can also contain other elements then iron and sulphur as for example nickel in the form of mackinawite $(Fe, Ni)_{1+x}S$ wherein x is from 0 to 0.1.

The impurities in the white pigment and impurities containing material may also be iron oxides.

Iron oxides in the meaning of the present invention are understood to be chemical compounds composed of iron and oxide. Iron oxide comprises, for example iron(II) oxide FeO, also known as wüstite, iron(I,III) oxides $Fe_3O_4$, also known as magnetite and iron(III) oxide $Fe_2O_3$. The iron oxides include also iron hydroxides and iron oxyhydroxides that contain beneath the elements iron and oxygen, the additional element hydrogen. Iron hydroxide comprises, for example iron(II) hydroxide $Fe(OH)_2$ and iron(III) hydroxide $Fe(OH)_3$, also known as bernalite. Iron oxyhydroxide comprises, for example α-FeOOH also known as goethite forming prismatic needle-like crystals, γ-FeOOH also known as lepidocrocite forming orthorhombic crystal structures, δ-FeOOH also known as feroxyhyte crystallizing in the hexagonal system and ferrihydrite $FeOOH.0.4H_2O$. The iron oxides can also contain additional elements as, for example, sulphur in $Fe_8O_8(OH)_6(SO_4).nH_2O$ also known as schwertmannite or chloride in FeO(OH,Cl) also known as akaganeite.

The white pigment and impurities containing material may comprise impurities that are selected from graphite.

Graphite in the meaning of the present invention is understood to be an allotrope of carbon. There are three principal types of natural graphite: Crystalline flake graphite, amorphous graphite and lump graphite. Crystalline flake graphite (or flake graphite for short) occurs as isolated, flat, plate-like particles with hexagonal edges if unbroken and, when broken, the edges can be irregular or angular. Amorphous graphite occurs as fine particles and is the result of thermal metamorphism of coal, the last stage of coalification, and is sometimes called meta-anthracite. Very fine flake graphite is sometimes called amorphous in the trade. Lump graphite (also called vein graphite) occurs in fissure veins or fractures and appears as massive platy intergrowths of fibrous or acicular crystalline aggregates.

Alternatively the impurities in the white pigment and impurities containing material may be silicates. The silicates may be colouring or abrasive.

Silicates or silicate minerals in the meaning of the present invention are understood to be compounds that comprise silicon and oxygen. Additionally, the silicates can comprises further ions such as for example aluminium ions, magnesium ions, iron ions or calcium ions. The silicates and silicate minerals can be selected from neosilicates, sorosilicates, cyclosilicates, inosilicates, phyllosilicates, and tectosilicates and amorphous silicates. Neosilicates are silicate minerals in which the $SiO_4$ tetrahedra are isolated and have metal ions as neighbours. Commonly known neosilicates are zircon, willemite, olivine, mullite, forsterite, aluminosilicates or fayalite. Sorosilicates are silicate minerals which have isolated double tetrahedral groups with a silicon to oxygen ratio of 2:7. Commonly known sorosilicates are ilavite, gehlenite, epidote or kornerupine. Cyclosilicates are ring silicates that contain rings of linked $SiO_4$ tetrahedra wherein the silicon to oxygen ratio is 1:3. Commonly known cyclosilicates are benitonite, beryl or tourmaline. Inosilicates or chain silicates are silicate minerals which have interlocking chains of silicate tetrahedra with either $SiO_3$ in a 1:3 ratio for single chains or $Si_4O_{11}$ in a 4:11 ratio for double chains. Commonly known inosilicates are enstatite, wollastonite, rhodenite, diopside or amphibolite as for example grunerite, cummingtonite, actinolithe or hornblende. Phyllosilicates are sheet silicates that form parallel sheets of silicate tetrahedra with $Si_2O_5$ or a silicon oxygen ration of 2:5. Commonly known phyllosilicates are clay minerals, for example talc, kaoline, kaolinitic clay, calcined kaolinitic clay, halloysite, dickite, vermiculite, nontronite, sepiolite or montmorillonite, mica minerals, for example, biotite, muscovite, phlogopite, lepidolite or glauconite, or a chlorite mineral, for example clinochlore. Tectosilicates or framework silicates have a three-dimensional framework of silicate tetrahedra with $SiO_2$ tetrahedra or a silicon oxygen ration of 1:2. Commonly known tectosilicates are quartz minerals as for example quartz, tridymite and cristobalite, feldspar minerals as for example potassium feldspars comprising orthoclase and microline, sodium or calcium feldspars comprising plagioclase, albite and andesine or scapolite and zeolithe. Amorphous silicates are for example diatomaceous earth or opale.

The silicate may be selected from the group consisting of quartz, a mica, an amphibolite, an feldspar, a clay mineral and mixtures thereof and, preferably, may be quartz.

The inventive process is especially contemplated for separating white pigments from impurities that consist of quartz and/or additional silicates.

Preferably the impurity in the white pigments and impurities containing material consist only of quartz.

Alternatively, the impurity or impurities in the white pigment and impurities containing material may comprise silicates that have a white colour. For example, the impurities may comprise silicates such as wollastonite, kaolin, kaolinitic clay, calcined kaolinitic clay, montmorillonite, talc, diatomaceous earth or sepiolite. In a preferred embodiment of the invention, the impurity consists of silicates that have a white colour and more preferably the impurity consists of only one white coloured silicate. For example, the impurity may consist only of wollastonite, kaolin, kaolinitic clay, calcines kaolinitic clay, montmorillonite, talc, diatomaceous earth or sepiolite. These impurities obtained and separated according to the inventive flotation method may be further processed and used in suitable applications. The impurities containing only white coloured silicates and, preferably containing only one white coloured silicate obtained by the inventive process may be used in the same way than the white pigment containing product.

In a preferred embodiment, the amount of white pigment in the white pigment and impurities containing material of step a) may be from 0.1 to 99.9 wt.-%, based on the dry weight, preferably from 30 to 99.7 wt.-%, more preferably from 60 to 99.3 wt.-% and most preferably from 80 to 99 wt.-%, based on the dry weight.

In another preferred embodiment, the weight ratio of white pigment:impurities in the white pigment and impurities containing material of step a) may be from 0.1:99.9 to 99.9:0.1, based on the dry weight, preferably from 30:70 to 99.7:0.3, more preferably from 60:40 to 99.3:0.7, and most preferably from 80:20 to 99:1, based on the dry weight.

The total amount of the white pigment and the impurities in the white pigment and impurities containing material of step a) may represent at least 90 wt.-% relative to the total weight of the white pigment and impurities containing material, preferably at least 95 wt.-%, more preferably at least 98 wt.-%, and most preferably at least 99 wt.-% relative to the total weight of the white pigment and impurities containing material.

As set out before, in a preferred embodiment the impurity in the white pigment and impurities containing material may consist of a silicate. In this case, the total amount of the white pigment and the silicate in the white pigment and impurities containing material of step a) represents at least 90 wt.-% relative to the total weight of the white pigment and impurities containing material, preferably at least 95 wt.-%, more preferably at least 98 wt.-%, and most preferably for at least 99 wt.-%.

Alternatively, the white pigment and impurities containing material may consist of white pigment and silicate. Preferably, the white pigment and impurities containing material may consist of white pigment and quartz. Alternatively, the white pigment and impurities containing material may consist of white pigment and a white colored silicate that is selected from the group consisting of wollastonite, kaolin, kaolinitic clay, calcines kaolinitic clay, montmorillonite, talc, diatomaceous earth or sepiolite.

The white pigment and impurities containing material of step a) may have a weight median grain diameter in the range of from 1 to 1000 µm, preferably of from 3 to 700 µm, more preferably of from 5 to 500 µm and most preferably of from 10 to 80 µm or from 100 to 400 µm.

In another preferred embodiment the white pigment and impurities containing material of step a) may have a weight median grain diameter in the range of from 1 to 1000 µm, preferably of from 3 to 500 µm, more preferably of from 5 to 100 µm and most preferably of from 10 to 80 µm if the subsequent flotation process is a standard flotation process. A standard flotation process in the meaning of the present invention is a flotation process that is performed after grinding and/or classification of the white pigment and impurities containing material.

In another preferred embodiment the white pigment and impurities containing material of step a) may have a weight median grain diameter in the range of from 1 to 1000 µm, preferably of from 10 to 700 µm, more preferably of from 50 to 500 µm and most preferably of from 100 to 400 µm if the subsequent flotation process is a coarse flotation process. A coarse flotation process in the meaning of the present invention is a flotation process that is performed within the first grinding loop of the white pigment and impurities containing material.

The Collector Agent

Step b) of the process of the present invention refers to the provision of at least one collector agent.

A collector agent in the meaning of the present invention is a chemical compound that is adsorbed by the envisaged particles either by chemisorptions or by physisorption. The collector agent is an organic collector compound that contains at least one amino group. The collector agent according to the present invention is selected from the group consisting of compounds of formula (1) and compounds of formula (2) and mixtures thereof

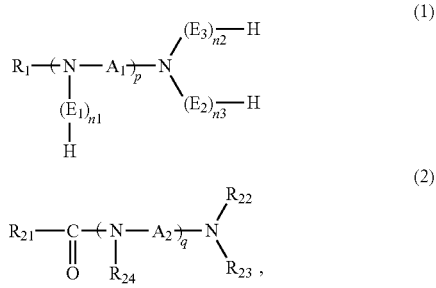

wherein
$R_1$ represents a hydrocarbon group containing from 6 to 30 carbon atoms,
$A_1$ represents an alkylene group having from 1 to 6 carbon atoms,
$E_1$, $E_2$ and $E_3$, are identical or different from each other, each independently chosen from among alkylene oxide groups containing from 1 to 6 carbon atoms,
$n_1$, $n_2$ and $n_3$, are identical or different from each other, each independently chosen from an integer which value is from 1 to 20,
p is 1, 2, 3 or 4,
$R_{21}$ represents a hydrocarbon group containing from 6 to 30 carbon atoms,
$R_{22}$ and $R_{23}$ are identical or different from each other, each independently chosen from among hydrocarbon groups containing from 1 to 6 carbon atoms,
$R_{24}$ represents hydrogen or a hydrocarbon group containing from 1 to 6 carbon atoms,
$A_2$ represents an alkylene group having from 1 to 6 carbon atoms,
q is 1, 2, 3 or 4.

The compounds of formula (1) and (2) may also be used in the form of their addition salts with one or more acid(s), said acid(s) being chosen from among mineral and organic acids, including, but not limited to, hydrochloric acid, acetic acid, phosphoric acid, sulphuric acid, alkane (e.g. methane) sulphonic acid, toluene sulphonic acid, and the like.

According to one embodiment of the present invention the compounds of formula (1) and/or formula (2) may have various $R_1$ and/or $R_{21}$ radicals and therefore may comprise a mixture of different compounds of formula (1) and/or formula (2). For example, the mixture will comprise compounds of formula (1) and/or formula (2) wherein the various $R_1$ and/or $R_{21}$ radicals contain from 16 to 18 carbon atoms.

The $R_1$ radical in the compounds of formula (1) and the $R_{21}$ radical in the compounds of formula (2) may be a straight, cyclic or branched, saturated or unsaturated hydrocarbon group having from 6 to 30, preferably from 8 to 26, more preferably from 12 to 22 carbon atoms, said group optionally containing one or more rings.

The $A_1$ radical may represents an alkylene group having from 1 to 6 carbon atoms, preferably from 2 to 6 carbon atoms, more preferably 2, 3 or 4 carbon atoms. Preferred compounds of formula (1) are those wherein $A_1$ represents propylene.

The radicals $E_1$, $E_2$ and $E_3$ may be chosen from methylene oxide —($CH_2$—O)—, ethylene oxide —($CH_2$—$CH_2$—O)—, propylene oxide —($CH_2$—CH($CH_3$)—O)— and/or —(CH($CH_3$)—$CH_2$—O)—, and butylene oxide —(CH($CH_2$—$CH_3$)—$CH_2$—O)— and/or —($CH_2$—CH($CH_2$—$CH_3$)—O)—. $E_1$, $E_2$ and $E_3$ are linked to the respective nitrogen atom via their sp2 carbon atom. Preferably $E_1$, $E_2$ and $E_3$ may be chosen from ethylene oxide —($CH_2$—$CH_2$—O)—, and propylene oxide —($CH_2$—CH($CH_3$)—O)— and/or —(CH($CH_3$)—$CH_2$—O)—. More preferably from 70 mol % to 100 mol % of all the alkylene oxide groups present in the compound of formula (1), are ethylene oxide groups and 0 mol % to 30 mol % are propylene oxide groups. Still more preferably $E_1$, $E_2$ and $E_3$ are identical radicals and are chosen from among ethylene oxide and propylene oxide, even more preferably all $E_1$, $E_2$ and $E_3$ are identical radicals and are ethylene oxide groups. It should also be understood that each of $E_1$, $E_2$ and $E_3$ may comprise two or more different alkylene oxides groups that may be arranged in block or random distribution.

The values $n_1$, $n_2$ and $n_3$, may be identical or different, and independently may represent an integer from 1 to 10, more preferably from 1 to 5, and still more preferably from 1 to 3. Preference may also given to compounds of formula (1) wherein the sum of $n_1+n_2+n_3$ is strictly less than 10.

Alternatively if the collector agent comprises compounds of formula (1) and additionally compounds of formula (2) the values $n_1$, $n_2$ and $n_3$, may be identical or different, and independently may represent an integer from 3 to 20, preferably from 3 to 10. In this case preference may also given to compounds of formula (1) wherein the sum $n_1+n_2+n3$ ranges from 10 to 40, preferably from 10 to 30.

The value p may be preferably 1 or 2, and more preferably 1.

According to a preferred embodiment, the compound of formula (1) possesses at least one of the following characteristics:
$R_1$ represents a straight or branched hydrocarbon group containing from 6 to 30 carbon atoms, preferably from 8 to 26, more preferably from 12 to 22 carbon atoms, optionally containing one or more insaturation(s), in the form of double and/or triple bond(s),
$A_1$ represents a straight or branched alkylene group having from 1 to 6 carbon atoms, preferably from 2 to 6 carbon atoms, more preferably 2, 3 or 4 carbon atoms,
$E_1$, $E_2$ and $E_3$, are identical or different from each other, each independently chosen from among ethylene oxide (OE) group, propylene oxide (OP) group and butylene oxide (OB) group, preferably among OE group and OP group, more preferably each of $E_1$, $E_2$ and $E_3$ represents an OE group,
$n_1$, $n_2$ and $n_3$, are identical or different from each other, each independently chosen from an integer which value is from 1 to 20, preferably from 1 to 10, and the sum
$n_1+n_2+n_3$ ranges from 3 to 9,
p is 1, 2, 3 or 4, preferably 1 or 2, and more preferably p is 1.

Alternatively, if the collector agent comprises compounds of formula (1) and, additionally, compounds of formula (2), the compounds of formula (1) may possess at least one of the following characteristics:
$R_1$ represents a straight or branched hydrocarbon group containing from 6 to 30 carbon atoms, preferably from 8 to 26, more preferably from 12 to 22 carbon atoms, optionally containing one or more insaturation(s), in the form of double and/or triple bond(s),
$A_1$ represents a straight or branched alkylene group having from 1 to 6 carbon atoms, preferably from 2 to 6 carbon atoms, more preferably 2, 3 or 4 carbon atoms,
$E_1$, $E_2$ and $E_3$, are identical or different from each other, each independently chosen from among ethylene oxide (OE) group, propylene oxide (OP) group and butylene oxide (OB) group, preferably among OE group and OP group, more preferably each of $E_1$, $E_2$ and $E_3$ represents an OE group, $n_1$, $n_2$ and $n_3$, are identical or different from each other, each independently chosen from an integer which value is from 1 to 20, preferably from 1 to 10, and the sum $n_1+n_2+n_3$ ranges from 3 to 40, and preferably from 3 to 30, p is 1, 2, 3 or 4, preferably 1 or 2, and more preferably p is 1.

According to a further preferred embodiment, the above compound of formula (1) may possess at least one of the following characteristics or may possess all of the following characteristics:

$R_1$ represents a straight alkyl group containing from 8 to 26, and more preferably from 12 to 22 carbon atoms, $A_1$ represents a straight alkylene group having from 2 to 4 carbon atoms, for example a —$(CH_2)_3$— (propylene) group, $E_1$, $E_2$ and $E_3$, are identical or different from each other, each independently chosen from among OE group and OP group, more preferably each of $E_1$, $E_2$ and $E_3$ represents an OE group, $n_1$, $n_2$ and $n_3$, are identical or different from each other, each independently chosen from an integer which value is from 1 to 5, preferably from 1 to 3 and the sum $n_1+n_2+n_3$ ranges from 3 to 9, for example the sum $n_1+n_2+n_3$ is 3, p is 1 or 2, and is preferably 1.

Alternatively if the collector agent comprises compounds of formula (1) and additionally compounds of formula (2), the compounds of formula (1) may possess at least one of the following characteristics or may possess all of the following characteristics:

$R_1$ represents a straight alkyl group containing from 8 to 26, and more preferably from 12 to 22 carbon atoms, $A_1$ represents a straight alkylene group having from 2 to 4 carbon atoms, for example a —$(CH_2)_3$— (propylene) group, $E_1$, $E_2$ and $E_3$, are identical or different from each other, each independently chosen from among OE group and OP group, more preferably each of $E_1$, $E_2$ and $E_3$ represents an OE group, $n_1$, $n_2$ and $n_3$, are identical or different from each other, each independently chosen from an integer which value is from 3 to 20, preferably from 3 to 10 or alternatively the sum $n_1+n_2+n_3$ ranges from 10 to 40, and preferably from 10 to 30, p is 1 or 2, and is preferably 1.

The compounds of formula (1) may be chosen from alkoxylated $C_6$-$C_{30}$ alkyl fatty polyamines, and preferably may be chosen from $C_6$-$C_{30}$ alkyl ethoxylated or propoxylated fatty diamines. "Polyamine" in the meaning of the present invention intends a compound comprising two or more amine groups, the amine groups possibly being substituted, i.e. the two or more amine groups may be identical or different and be primary, secondary or tertiary amine groups.

Preferred compounds of formula (2) may possess at least one of the following characteristics:

$R_{22}$ and $R_{23}$ are identical or different from each other, each independently chosen from among hydrocarbon groups containing from 1 to 6 carbon atoms, preferably from 1 to 4 carbon atoms, and more preferably are chosen from among methyl, ethyl, propyl and butyl, $R_{24}$ represents hydrogen, $A_2$ represents an alkylene group having 1, 2, 3 or 4 carbon atoms, and preferably $A_2$ is ethylene or propylene, and more preferably propylene, q is 1 or 2, and preferably 1.

The compounds of formula (1) and (2) are commercially available or may be prepared according to known preparations techniques.

For example, compounds of formula (1) may be easily obtained by condensation of a fatty polyamine with alkylene oxide(s). A typical example of a compound of formula (1) is an ethoxylated tallow diamine, for example a tallow diamine reacted with 3 molecules of ethylene oxide, typically N',N',N'-tri-hydroxyethyl-N-tallow (or arachidyl or behenyl) propylene diamine (tallow or arachidyl or behenyl diamine with 3 moles ethylene oxide), having CAS RN 61790-85-0. This compound is of particular interest as it is liquid at room temperature, easy to handle, readily dispersible in water, and being biodegradable.

As other compounds of formula (1), mention may be made of various alkoxylated propylene diamine compounds, among which mention may be made of, for example, N,N',N'-tri-hydroxyethyl-N-oleyl propylene diamine (CAS Registry Number 103625-43-0), N,N',N'-tri-hydroxyethyl-N-lauryl propylene diamine (CAS RN 25725-44-4), propoxylated N-tallow alkyl trimethylene diamines (CAS RN 68603-75-8), and the like.

Compounds of formula (2) may be easily obtained by condensation of an unsaturated fatty acid (rapeseed oil, tall oil) with an amine compound of formula (2'):

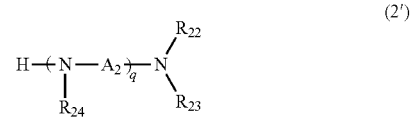

(2')

wherein $R_{22}$, $R_{23}$, $R_{24}$, $A_2$ and q are as defined above.

The condensation product of dimethyl amino propyl amine with a $C_{16}$-$C_{18}$ unsaturated fatty acid, such as from rapeseed oil (CAS RN 85408-42-0), or from tall oil (CAS RN 68650-79-3) are of particular interest as they are liquid at room temperature (easy to handle), readily dispersible in water and provide the further advantage of being biodegradable.

Other examples of compounds of formula (2) are the condensation products of dimethyl amino propyl amine with a coco, palm, tallow, and/or oleic fatty acid, and/or with a $C_{12}$ (e.g. lauric) fatty acid, and/or with a $C_{11}$ (e.g. ricinoleic) fatty acid, and/or with $C_{20}$-$C_{22}$ fatty acid, and/or the like. Other examples of compounds of formula (2) are those with the following Registry CAS numbers: 68188-30-7, 69278-64-4, 691400-76-7, 165586-99-2, 226994-25-8, 97552-95-9 which are the condensation products of dimethyl amino propyl amine with soya oil, castor oil, peanut oil, almond oil, avocado oil, fish oil, respectively.

The collector agent may be selected from the group consisting of compounds of formula (1) and compounds of formula (2) and mixtures thereof. For example, the collector agent may consist of one compound of formula (1) and at least one compound of formula (2) or may consist of one compound of formula (2) and at least one compound of formula (1). In a preferred embodiment the collector agent may consist of only one compound of formula (1) and only one compound of formula (2).

The weight ratio of compound(s) of formula (1) to compound(s) of formula (2) in the collector agent may vary in great proportions, without any specific limitation. According to a preferred embodiment, this weight ratio ranges from 1:99 to 99:1, more preferably from 20:80 to 80:20, even more preferably from 40:60 to 60:40, based on dry weight of the compounds of formula (1) and (2). Particularly satisfactory results are obtained with a 50:50 weight ratio mixture of at least one compound of formula (1) and at least one compound of formula (2), and typically with a 50:50 weight ratio mixture consists of one compound of formula (1) and one compound of formula (2).

Alternatively, the collector agent may consist only of one or more compounds of formula (1) or may consist only of one or more compounds of formula (2).

The collector agent may be substantially free, and more preferably may be totally free, from any quaternary ammonium-containing compound.

Step c) of the Process of the Invention

Step c) of the process of the invention refers to mixing said white pigment and impurities containing material of step a) and said collector agent of step b), in an aqueous environment to form an aqueous suspension.

According to one embodiment of the present invention the at least one white pigment and impurities containing material of step a) may be mixed, in a first step, with water, and then, the obtained suspension may be mixed with the collector agent of step b) to form an aqueous suspension.

The collector agent of step b) may be mixed, in a first step, with water, and then, the obtained suspension may be mixed with the at least one white pigment and impurities containing material of step a) to form an aqueous suspension.

According to another embodiment of the present invention, the at least one white pigment and impurities containing material of step a) and the collector agent of step b) may be mixed in one step with water to form an aqueous suspension.

Preferably, mixing may be carried out using a wet mill, a mixing tank or a flotation agitator for mixing the collector into the aqueous suspension.

The mixing may be carried out at room temperature, i.e. at 20° C.±2° C., or at other temperatures. According to one embodiment the mixing may be carried out at a temperature from 5 to 90° C., preferably from 10 to 80° C. and most preferably from 20° C. to 60° C., or at other temperatures. Heat may be introduced by internal shear or by an external source or a combination thereof.

The water of step c) may be preheated before it is mixed with the white pigment and impurities containing material of step a) and the collector agent of step b).

Mixing may be carried out for at least 1 s, preferably for at least 1 min, e.g. for at least 15 min, 30 min, 1 hour, 2 hours, 4 hours, 6 hours, 8 hours, or 10 hours.

The solids content of the aqueous suspension obtained by the inventive method can be adjusted by the methods known to the skilled person. To adjust the solids content of an aqueous white pigments and impurities containing material comprising suspension, the suspension may be partially or fully dewatered by a filtration, centrifugation or thermal separation process. For example, the suspension may be partially or fully dewatered by a filtration process such as filtration or a thermal separation process such as an evaporation process. Alternatively, water may be added to the white pigment and impurities containing material until the desired solids content is obtained. Additionally or alternatively, a suspension having an appropriate lower content of a white pigment and impurities containing material may be added to the aqueous suspension until the desired solid content is obtained.

According to a preferred embodiment, of the present invention the aqueous suspension obtained in step c) has a solids content measured as described in the Examples section hereafter of between 5 and 80 wt.-% based on the total weight of the solids in the suspension, preferably of between 10 and 70 wt.-%, more preferably of between 20 and 60 wt.-% and most preferably of between 25 and 55 wt.-%, based on the total weight of the solids in the suspension.

The aqueous suspension obtained in step c) may have a pH from 7 to 12, preferably from 7.5 to 11 and more preferably from 8.5 to 9.5.

The inventive collecting agent(s) may be added in step c) in an amount of from 5 to 5000 ppm, based on the total dry weight of the mineral material of step a), preferably in an amount of from 20 to 2000 ppm, more preferably in an amount of from 30 to 1000 ppm, and most preferably in an amount of from 50 to 800 ppm, based on the total dry weight of the mineral material of step a).

The amount of the inventive collecting agent may be adjusted by considering the specific surface area of the impurities. According to one embodiment, the inventive collecting agent may be added in step c) in an amount of from 1 to 100 mg per $m^2$ of impurities in said white pigment containing material of step a), preferably in an amount of from 5 to 50 mg per $m^2$ of impurities in said white pigment containing material of step a), and most preferably of from 10 to 45 mg per $m^2$ of impurities in said white pigment containing material of step a). The specific surface area of the impurities is measured as described in the Examples section hereafter.

The inventive collecting agent(s) may be present in the aqueous suspension obtained in step c) in an amount of from 0.01 to 10 wt.-%, based on the total weight of the solids in the suspension, preferably from 0.05 to 5 wt.-%, more preferably from 0.1 to 3.0 wt.-%, and most preferably from 0.2 to 2.0 wt.-%, based on the total weight of the solids in the suspension.

Additionally to the white pigment and impurities containing material a) and the collector agent b), one or more further additives may be present in the aqueous suspension. Possible additives are, for example pH-adjusting agents, solvents (water, organic solvent(s) and mixtures thereof); depressants, such as starch, quebracho, tannin, dextrin and guar gum, and polyelectrolytes, such as polyphosphates and water glass, which have a dispersant effect, often combined with a depressant effect. Other conventional additives that are known in the art of flotation are frothers (foaming agents), such as methyl isobutyl carbinol, triethoxy butane, pine oil, terpineol and polypropylene oxide and its alkyl ethers, among which methyl isobutyl carbinol, triethoxy butane, pine oil, terpineol, are preferred frothers. By way of non limiting examples, preferred conventional additives are generally frothers, among which terpineol is the most commonly used.

Furthermore, one or more other conventional collector agents known in the art of flotation, and preferably one or more conventional cationic collector agents may be in the aqueous suspension formed in step c). Preferred conventional cationic collector agents are those containing no sulphur atoms, and most preferred are those containing only carbon, nitrogen and hydrogen atoms and optionally oxygen atoms. Conventional cationic collector agents, in the form of their addition salts with acids, may however contain sulphur atom(s), when the salifying acid itself comprises sulphur atom(s), e.g. sulphuric, sulphonic or alkane sulphonic acid.

Examples of conventional cationic collector agents that may be present in the suspension obtained from step c) may include, but are not limited to fatty amines and their salts, as well as their alkoxylated derivatives, fatty poly(alkylene amines) and their salts, e.g. poly(ethylene amines), polypropylene amines) and their salts, as well as their alkoxylated derivatives, fatty amidopolyamines, and their salts, as well as their alkoxylated derivatives, fatty amidopoly(alkylenamines), and their salts, as well as their alkoxylated derivatives, fatty imidazolines and their salts, as well as their alkoxylated derivatives, N-fatty alkyl amino carboxylic acid and their salts, e.g. N-fatty alkyl amino propionic acid and their salts, alkyl ether amines and alkyl ether diamines and their salts, quaternary ammonium compounds, e.g. fatty quaternary ammonium compounds, mono(fatty alkyl) quaternary ammonium compounds, di(fatty alkyl) quaternary ammonium compounds, such as those described in WO 2007/122148, and the like.

A "polyamine" in the meaning of the present invention is a compound comprising two or more amine groups, the amine groups possibly being substituted, i.e. the two or more amine groups may be identical or different and be primary, secondary or tertiary amine groups.

Specific examples of conventional cationic collector agents that may be present in the suspension obtained from step c) may include, without any limitation, dicoco-dimethyl ammonium chloride (CAS RN 61789-77-3), coco-dimethylbenzyl ammonium chloride (CAS RN 61789-71-7), tallow dimethyl benzyl ammonium chloride (CAS RN 61789-75-1), ethoxylated tallow monoamine, 1,3-propanediamine-N-tallow diacetate (CAS RN 68911-78-4), N,N',N'-tri-hydroxyethyl N-tallow propylene diamine (CAS RN 61790-85-0), N,N',N'-tri-hydroxyethyl N-oleyl propylene diamine (CAS RN 103625-43-0), N,N',N'-tri-hydroxyethyl N-lauryl propylene diamine (CAS RN 25725-44-4), fatty alkyl imidazoline obtained by condensation of diethylenetriamine and oleic fatty acid (CAS RN 162774-14-3), N,N',N'-tri-hydroxyethyl N-behenyl-propylene diamine (CAS RN 91001-82-0), isodecyloxypropyl-1,3-diaminopropane (CAS RN 72162-46-0), N,N-di(tallow carboxyethyl)-N-hydroxyethyl-N-methyl ammonium methylsulphate (CAS RN 91995-81-2), N-coco-β-aminopropionic acid (CAS RN 84812-94-2), N-lauryl-β-aminopropionic acid (CAS RN 1462-54-0), N-myristyl-β-aminopropionic acid (CAS RN 14960-08-8), their addition salts with acid(s), sodium salt of N-lauryl-β-aminopropionic acid (CAS RN 3546-96-1), triethanolamine salt of N-lauryl-β-aminopropionic acid (CAS RN 14171-00-7), triethanolamine salt of N-myristyl-β-aminopropionic acid (CAS RN 61791-98-8), as well as mixtures of two or more of the above compounds, in all proportions, and the like.

"Etheramines" and "etherdiamines" in the meaning of the present invention are compounds comprising at least one ether group and respectively a $NH_2$ terminal group and a $NH_2$ terminal group as well as another primary, secondary or tertiary amine group.

If there are additives and/or conventional collector agents in the suspension, the collector agent of the present invention may be present from 1 wt.-% to 100 wt.-%, more preferably from 10 wt.-% 100 wt.-%, typically from 20 wt.-% to 100 wt.-%, and advantageously from 1 wt.-% to 99 wt.-%, more preferably from 10 wt.-% to 99 wt.-%, typically from 20 wt.-% to 99 wt.-% relative to the total amount of the collector agent and the further additives.

Step d) of the Process of the Invention

Step d) of the process of the invention refers to passing a gas through the suspension formed in step c).

The gas may be generally introduced in the vessel of step d) via one or more entry ports located in the lower half of the vessel. Alternatively or additionally, the gas may be introduced via entry ports located on an agitation device in said vessel. The gas then naturally rises upwards through the suspension.

Preferably the gas in the present invention may be air.

The gas may have a bubble size in the suspension of between 0.01 and 10 mm, preferably of between 0.05 and 5 mm and most preferably between 0.1 and 2 mm. The gas flow rate in step d) may be adjusted, e.g. between 0.1 and 30 $dm^3$/min, preferably between 1 and 10 $dm^3$/min and more preferably between 3 and 7 $dm^3$/min in a 4 $dm^3$ flotation cell.

According to a preferred embodiment of the invention, step d) may implement an agitation cell and/or a flotation column and/or a pneumatic flotation device and/or a flotation device featuring a gas injection.

According to a preferred embodiment of the present invention, the aqueous suspension in step d) may have a temperature of between 5 and 90° C., preferably between 10 and 70° C., more preferably of between 20 and 50° C. and most preferably between 25 and 40° C.

Step d) may be preferably performed under agitation. Furthermore, step d) may be continuous or discontinuous.

According to a preferred embodiment, step d) is performed until no more foam is formed or can be visually observed or until no more impurities can be collected in the foam.

Step e) of the Process of the Invention

Step e) of the process of the invention refers to recovering the white pigment containing product by removing the white pigment bearing phase from the aqueous suspension obtained after step d).

The inventive process comprises at least one indirect flotation step. In contrast to conventional flotation, in which the desirable white pigments are directly floated and collected from the produced froth, reverse or indirect flotation aims to have the undesirable impurities preferentially floated and removed, leaving behind a suspension that has been concentrated in the desirable white pigments. According to the present invention, the inventive process leads to the formation of a froth containing the impurities and a white pigment bearing phase with the white pigment containing product. The hydrophobised impurities are migrating to the surface of the suspension and are concentrated in a supernatant foam or froth at the surface. This foam can be collected by skimming it off the surface, using for example a scraper, or simply by allowing an overflowing of the foam, and passing the foam into a separate collection container. After collecting the foam, the white pigment bearing phase containing the non-floated white pigment containing product will remain. The white pigment containing product remaining in the aqueous suspension can be collected by filtration to remove the aqueous phase, by decantation or by other means commonly employed in the art to separate liquids from solids.

The collected white pigment containing product can be subjected to one or more further steps of froth flotation, according to the invention or according to prior art froth flotation methods.

According to a preferred embodiment, the white pigment bearing phase obtained from step e) may be ground before and/or after step e).

The grinding step can be carried out with any conventional grinding device, for example by e.g. using a ball mill, a hammer mill, a rod mill, a vibrating mill, a roll crusher, a centrifugal impact mill, a vertical bead mill, an attrition mill, a pin mill, a hammer mill. However, any other device that is able to grind the white pigment containing product recovered during method step e) may be used.

Step e) of the inventive process may be followed by at least one grinding or classification step for example by wet grinding and screening to achieve a fine ground product slurry and/or at least one other treatment step.

The hydrophobised impurities obtained by the inventive process and, preferably the hydrophobised silicates that are contained in the foam can be collected as already set out above. In a preferred embodiment of the invention, the hydrophobised impurities may comprise silicates that have a white colour as for example wollastonite, kaolin, kaolinitic clay, calcines kaolinitic clay, montmorillonite, talc, diatomaceous earth or sepiolite. More preferably, the hydrophobised impurity consists of silicates that have a white colour and more preferably the impurity consists of only one white coloured silicate. For example, the impurity may consist only of wollastonite or kaolin or kaolinitic clay or calcines kaolinitic clay or montmorillonite or talc or diatomaceous earth or sepiolite. These impurities obtained and separated from the white pigments according to the inventive flotation method may be further processed and used in suitable applications. The impurities containing only white coloured silicates and, preferably containing only one white coloured silicate obtained by the inventive process may be used in the same way than the white pigment containing product, for example in paper, plastics, paint, coatings, concrete, cement, cosmetic, water treatment and/or agriculture applications.

White Pigment Containing Product Obtained by the Process of the Invention

In a preferred embodiment the white pigment containing product obtained by the process of the invention may comprise at least 95 wt.-% white pigments, based on the dry weight, preferably at least 98 wt.-%, more preferably at least 99 wt.-% and most preferably at least 99.9 wt.-%, based on the dry weight.

The white pigment containing product as well as the white pigment bearing phase obtained by the inventive process can be used in paper, plastics, paint, coatings, concrete, cement, cosmetic, water treatment and/or agriculture applications. Preferably, the white pigment containing product may be used in a wet end process of a paper machine, in cigarette paper, board, and/or coating applications, or as a support for rotogravure and/or offset and/or ink jet printing and/or continuous ink jet printing and/or flexography and/or electrophotography and/or decoration surfaces.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

The scope and interest of the invention will be better understood based on the following examples which are intended to illustrate certain embodiments of the invention and are non-limitative.

EXAMPLES

1. Measurement Methods pH Measurement

The pH was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Aldrich). The reported pH values were the endpoint values detected by the instrument (the endpoint was when the measured signal differs by less than 0.1 mV from the average over the last 6 seconds).

Particle Size Distribution (Mass % Particles with a Diameter<X) and Weight Median Grain Diameter ($d_{50}$) of Particulate Material Using Sedigraph™ 5120

Weight median grain diameter and grain diameter mass distribution of a particulate material were determined via the sedimentation method, i.e. an analysis of sedimentation behaviour in a gravimetric field. The measurement was made with a Sedigraph™ 5120.

The method and the instrument are known to the skilled person and are commonly used to determine grain size of fillers and pigments. The measurement was carried out in an aqueous solution of 0.1% by weight of $Na_4P_2O_7$. The samples were dispersed using a high speed stirrer and ultrasonic.

Median Grain Diameter $d_{50}$ of Particulate Material Using Malvern Mastersizer 2000

Median grain diameter, $d_{50}$ was determined using a Malvern Mastersizer 2000 Laser Diffraction System, with a defined RI of 1.57 and iRI of 0.005, Malvern Application Software 5.60. The measurement was performed on an aqueous dispersion. The samples were dispersed using a high-speed stirrer. In this respect, the $d_{50}$ values define the diameters, at which 50 vol.% of the particles measured, have a diameter smaller than $d_{50}$ value, respectively.

Weight Solids (Wt.-%) of a Material in Suspension

The weight solids were determined by dividing the weight of the solid material by the total weight of the aqueous suspension. The weight of the solid material is determined by weighing the solid material obtained by evaporating the aqueous phase of suspension and drying the obtained material to a constant weight.

Specific Surface (BET) Measurement

The specific surface area (in $m^2/g$) of the white pigment or of the impurities was determined using nitrogen and the BET method, which is well known to the skilled man (ISO 9277:1995). The total surface area (in $m^2$) of the white pigment or of the impurities was then obtained by multiplication of the specific surface area and the mass (in g) of the white pigment or of the impurities. The method and the instrument are known to the skilled person and are commonly used to determine specific surface of white pigments or of the impurities.

Carbon Fraction Determination (% by Weight)

10 g of the white pigment and impurities containing material or of the white pigment containing product is dissolved in 150 g of an aqueous solution of 10% active content hydrochloric acid under heating at between 95 and 100° C. Following complete dissolution, the solution is allowed to cool to room temperature and, thereafter, is filtered and washed on a 0.2 μm membrane filter. The collected material, including the filter, is then dried in an oven at 105° C. to constant weight. The so-dried material ("insoluble material") is then allowed to cool to room temperature and weighed, correcting the weight by subtracting the filter weight (hereafter the "insoluble weight"). This insoluble weight value is subtracted from 10 g, and the resulting figure is then multiplied by 100% and divided by 10 g, to give the carbonate fraction. The carbonate fraction is a measure for the amount of impurities in the white pigment and impurities containing material or of the white pigment containing product.

Brightness Measurement

The samples from the flotation process were ground either dry or wet to a defined product fineness (e.g. $d_{50}=5$ $d_{50}=1.5$ μm or $d_{50}=0.7$ μm). If the samples were wet ground they were dried by use of microwave.

The obtained dry powders were prepared in a powder press to get a flat surface and Tappi brightness (R457 ISO brightness) is measured according to ISO 2469 and yellow-index according to DIN 6167 using an ELREPHO 3000 from the company Datacolor. The results for the Tappi brightness are given as percentage in comparison to a calibration standard. The yellow index is calculated from the reflexion values ($R_i=(R_x-R_z)/R_y$).

2. White Pigments and Collector Agents

In the following examples, the impurities identified have the following corresponding chemical formula:

TABLE 1

Impurities and the corresponding chemical formulas

| Impurities name | Chemical Formula |
|---|---|
| Silicates (non-exhaustive list) | |
| Quartz | $SiO_2$ |
| Muskovite | $KAl_2(Si_3Al)O_{10}(OH, F)_2$ |
| Biotite | $K(Mg, Fe)_3(AlSi_3)O_{10}(OH, F)_2$ |
| Chlorite | $Na_{0.5}Al_4Mg_2Si_7AlO_{18}(OH)_{12} \cdot 5(H_2O)$ |
| Plagioclase | $(Na, Ca)[(Si, Al)AlSi_2O_8]$ |
| Orthoclase | $KAlSi_3O_8$ |
| Montmorrilonite | $Na_{0.3}Fe_2Si_3AlO_{10}(OH)_2 \cdot 4(H_2O)$ |
| Amphibole | $NaCa2Fe^{II}4Fe^{III}[(OH)_2Al_2Si_6O_{22}]$ |
| Talc | $Mg_3Si_4O_{10}(OH)_2$ |
| Non-silicates (non-exhaustive list) | |
| Graphite | C |
| Pyrite | $FeS_2$ |
| Magnetite | $Fe_3O_4$ |

In the following examples, the collector agents identified have the following corresponding chemical formula:

Reagent PX 5274 (Inventive)
  N,N',N'-tri-hydroxyethyl N-tallow propylene diamine (CAS RN 61790-85-0)
Reagent PX 5275 (Inventive)
  mixture of N,N',N'-tri-hydroxyethyl N-tallow propylene diamine (CAS RN 61790-85-0) and rapeseed-oil, N-(3-(dimethyl amino)-propyl))amide, (CAS RN 85408-42-0) in a weight ratio 50/50
Reagent PX 5276 (Inventive)
  mixture of N,N',N'-tri-hydroxyethyl N-tallow propylene diamine (CAS RN 61790-85-0) and terpineol in a weight ratio 90/10

Reagent Lupromin FP 18 AS (Comparative)
Polymeric Esterquat
Commercial available from BASF

3. Examples

All froth flotation trials were performed at room temperature (20±2° C.) in an Outotec laboratory flotation cell, equipped with a conical gassing agitator under agitation of 1 600 rpm under use of a 4 $dm^3$ capacity glass cell. The solids content of the aqueous white pigment and impurities containing material suspension added to the flotation machine was of 33% by dry weight, said white pigment and impurities containing material being sourced from sedimentary marble rock deposits with different origins, running already a flotation process. The used water was original tab water from each local flotation process.

80% a typical practiced dosage of the flotation agent were given in the beginning of the trial and mixed within a 2 min conditioning time. A second dosage was added depending on the achieved froth product and visual seen impurities in the cell.

A flotation gas, consisting of air, was then introduced via orifices situated along the axis of the agitator at a rate of approximately 3 $dm^3$/min.

The foam created at the surface of the suspension was separated from the suspension by overflow and skimming until no more foam could be collected, and both the remaining suspension and the collected foam were dewatered and dried in order to form two concentrates for mass balance and quality analyses like carbon fraction determination.

Comparative Examples are marked with a "C" after the Example number.

Examples 1 to 3

For Examples 1 to 3 a white pigment and impurities containing material from Gummern marble deposit in Autria is selected. The material contains 3.21 wt.-% of impurities determined by carbon fraction determination. The material is crushed and pre ground to a median grinding size $d_{50}$ of 20 μm. The material is treated according to the above mentioned process. The test data are summarized in the following table 2.

TABLE 2

Examples 1 to 3

Flotation data

| | | Amount of | White pigment containing product | | |
|---|---|---|---|---|---|
| Test No. | Collector agent | Collector agent [ppm] | Impurities [wt.-%] | Tappi-brightness | Yellow-index |
| 1 | PX 5274 | 500 | 0.21 | 93.7 | 2.5 |
| 2 | PX 5275 | 500 | 0.12 | 93.5 | 2.6 |
| 3 | PX 5276 | 300 | 0.44 | 92.1 | 2.6 |

As can be seen from Examples 1 to 3 the inventive process for manufacturing white pigment containing products shows good results (low amount of impurities in the white pigment containing product, high values for Tappi-brightness and low values for yellow-indes) even at low amounts of collector agent (Example 3: 300 ppm) within the aqueous suspension.

Examples 4 to 7

For Examples 4 to 7 a white pigment and impurities containing material from Styria was selected, wherein the white pigment was marble and the impurities were silicate minerals. The material contains 0.74 wt.-% of impurities determined by carbon fraction determination. The white pigment and impurities containing material had a low amount of silicate minerals in the feed. The material was crushed and pre ground to a median grinding size $d_{50}$ of 11 μm. The material was treated according to the above mentioned process. The test data are summarized in the following table 3.

TABLE 3

Examples 4 to 7

| | | Flotation data | | | |
|---|---|---|---|---|---|
| | | Amount of | White pigment containing product | | |
| Test No. | Collector agent | Collector agent [ppm] | Impurities [wt.-%] | Tappi-brightness | Yellow-index |
| 4 | PX 5274 | 400 | 0.09 | 94.5 | 1.5 |
| 5 | PX 5275 | 400 | 0.10 | 93.9 | 2.0 |
| 6C | Lupromin 18AS | 450 | 0.21 | 93.9 | 1.9 |
| 7C | Lupromin 18AS | 450 | 0.30 | 92.3 | 1.9 |

The results show clearly that the inventive process for manufacturing white pigment containing products (Examples 4 and 5) is advantageous compared to prior art flotation processes (Examples 6C and 7C). The amount of impurities in the white pigment containing products obtained by the inventive process is much lower than the amount of impurities in the white pigment containing products obtained by a comparative process. This good result is achievable even if the amount of collector agent in the inventive process is around 12% lower than the amount of collector agent in the comparative process.

Examples 8 to 11

For Examples 8 to 11 a white pigment and impurities containing material from a Swedish deposit was selected, wherein the white pigment was marble and the impurities were silicate minerals. The material contains 0.74 wt.-% of impurities determined by carbon fraction determination. The white pigment and impurities containing material had a high amount of silicate minerals in the feed. The material was crushed and pre ground to a median grinding size $d_{50}$ of 35 μm. The material was treated according to the above mentioned process. The test data are summarized in the following table 4.

TABLE 4

Examples 8 to 11

| | | Flotation data | | | |
|---|---|---|---|---|---|
| | | Amount of | White pigment containing product | | |
| Test No. | Collector agent | Collector agent [ppm] | Impurities [wt.-%] | Tappi-brightness | Yellow-index |
| 8 | PX 5274 | 400 | 0.09 | 94.5 | 1.5 |
| 9 | PX 5275 | 400 | 0.10 | 93.9 | 2.0 |
| 10C | Lupromin 18AS | 450 | 0.21 | 93.9 | 1.9 |
| 11C | Lupromin 18AS | 400 | 0.30 | 92.3 | 1.9 |

The results show clearly that the inventive process for manufacturing white pigment containing products (Examples 8 and 9) is advantageous compared to prior art flotation processes (Examples 10C and 11C). The amount of impurities in the white pigment containing products obtained by the inventive process is much lower than the amount of impurities in the white pigment containing products obtained by a comparative process. This good result is achievable even if the amount of collector agent in the inventive process is around 12% lower than the amount of collector agent in the comparative process.

Example 12 to 14

For Examples 12 to 14 a white pigment and impurities containing material from a Spanish deposit was selected, wherein the white pigment was marble and the impurities were silicate minerals. The material contains 0.34 wt.-% of impurities determined by carbon fraction determination. The white pigment and impurities containing material had a low amount of silicate minerals in the feed. The material was crushed and pre ground to a median grinding size $d_{50}$ of 15 μm. The material was treated according to the above mentioned process. The test data are summarized in the following table 5.

TABLE 5

Examples 12 to 14

| | | Flotation data | | | |
|---|---|---|---|---|---|
| | | Amount of | White pigment containing product | | |
| Test No. | Collector agent | Collector agent [ppm] | Impurities [wt.-%] | Tappi-brightness | Yellow-index |
| 12C | Lupromin 18 AS | 100 | 0.04 | 93.2 | 3.0 |
| 13 | PX 5274 | 100 | 0.03 | 94.4 | 2.4 |
| 14 | PX 5275 | 100 | 0.03 | 93.8 | 2.6 |

The results show clearly that the inventive process for manufacturing white pigment containing products (Examples 13 and 14) is advantageous compared to prior art flotation processes (Example 12C). The amount of impurities in the white pigment containing products obtained by the inventive process is comparable to the amount of impurities in the white pigment containing product obtained by a comparative process if the amount of collector agents in both processes is the same (100 ppm). However, the Tappi-brightness of the white pigment containing product obtained by the inventive process is superior to the Tappi-brightness of the white pigment containing product obtained by the comparative process. Also the yellow-index of the white pigment containing product obtained by the inventive process is much lower than the yellow-index of the white pigment containing product obtained by the comparative process.

The invention claimed is:
1. A process for manufacturing a white pigment containing product comprising the following steps:
   a) providing at least one white pigment and impurities containing material,
   b) providing at least one collector agent selected from the group consisting of compounds of formula (1),

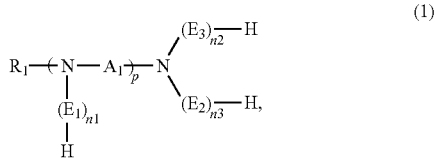

wherein
$R_1$ represents a hydrocarbon group containing from 6 to 30 carbon atoms,
$A_1$ represents an alkylene group having from 1 to 6 carbon atoms,
$E_1$, $E_2$ and $E_3$, are identical or different from each other, each independently chosen from among alkylene oxide groups containing from 1 to 6 carbon atoms,
$n_1$, $n_2$ and $n_3$, are identical or different from each other, each independently chosen from an integer which value is from 1 to 20,
p is 1, 2, 3 or 4,
and compounds of formula (2)

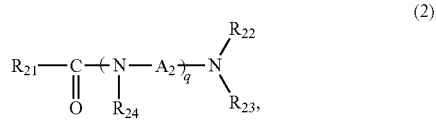

wherein
$R_{21}$ represents a hydrocarbon group containing from 6 to 30 carbon atoms,
$R_{22}$ and $R_{23}$ are identical or different from each other, each independently chosen from among hydrocarbon groups containing from 1 to 6 carbon atoms,
$R_{24}$ represents hydrogen or a hydrocarbon group containing from 1 to 6 carbon atoms,
$A_2$ represents an alkylene group having from 1 to 6 carbon atoms, and
q is 1, 2, 3 or 4,
and mixtures of compounds (1) and (2),
  c) mixing the white pigment and impurities containing material of step a) and the collector agent of step b) in an aqueous environment to form an aqueous suspension,
  d) passing gas through the suspension formed in step c), and
  e) recovering the white pigment containing product by removing a white pigment bearing phase from the aqueous suspension obtained after step d).

2. The process according to claim 1, wherein step d) results in the formation of a froth containing the impurities and a white pigment bearing phase with the white pigment containing product.

3. The process according to claim 1, wherein the white pigment is selected from the group consisting of a white mineral pigment, natural calcium carbonate, ground calcium carbonate, calcium carbonate-containing mineral material, dolomite, barite, aluminium oxide, titanium dioxide, and any mixture thereof.

4. The process according to claim 1, wherein the white mineral pigment is an alkaline earth metal carbonate, a calcium carbonate, or ground calcium carbonate (GCC).

5. The process according to claim 1, wherein the white pigment containing material comprises impurities selected from the group consisting of iron sulphides, iron oxides, graphite, silicates, and any mixture thereof.

6. The process according to claim 5, wherein the silicates are selected from the group consisting of quartz, a mica, an amphibolite, an feldspar, a clay mineral and any mixture thereon.

7. The process according to claim 5, wherein the silicate is a white coloured silicate selected from the group consisting of wollastonite, kaolin, kaolinitic clay, calcined kaolinitic clay, montmorillonite, talc, diatomaceous earth, sepiolite, and any mixture thereof.

8. The process according to claim 1, wherein the white pigment is present in the white pigment and impurities containing material of step a) in an amount from 30 to 99.6 wt.-%, based on the dry weight of the white pigment and impurities containing material, and the impurities are present in the white pigment and impurities containing material of step a) in an amount from 0.4 to 60 wt.-%, based on the dry weight of the white pigment and impurities containing material.

9. The process according to claim 1, wherein the white pigment is present in the white pigment and impurities containing material of step a) in an amount from 60 to 99.3 wt.-%, based on the dry weight of the white pigment and impurities containing material, and the impurities are present in the white pigment and impurities containing material of step a) in an amount from 0.7 to 40 wt.-%, based on the dry weight of the white pigment and impurities containing material.

10. The process according to claim 1, wherein the white pigment is present in the white pigment and impurities containing material of step a) in an amount from 80 to 99 wt.-%, based on the dry weight of the white pigment and impurities containing material, and the impurities are present in the white pigment and impurities containing material of step a) in an amount from 1 to 20 wt.-%, based on the dry weight of the white pigment and impurities containing material.

11. The process according to claim 1, wherein the white pigment and impurities containing material of step a) has a weight median grain diameter in the range of from 1 to 1000 µm.

12. The process according to claim 1, wherein the white pigment and impurities containing material of step a) has a weight median grain diameter in the range of from 5 to 500 µm.

13. The process according to claim 1, wherein the white pigment and impurities containing material of step a) has a weight median grain diameter in the range of from 10 to 80 µm.

14. The process according to claim 1, wherein the compound of formula (1) possesses the following characteristics:
  $R_1$ represents a straight or branched hydrocarbon group containing from 8 to 26 carbon atoms, optionally containing one or more insaturation(s), in the form of double and/or triple bond(s),
  $A_1$ represents a straight or branched alkylene group having from 2 to 6 carbon atoms,
  $E_1$, $E_2$ and $E_3$, are identical or different from each other, each independently chosen from among ethylene oxide (OE) group, propylene oxide (OP) group and butylene oxide (OB) group,
  $n_1$, $n_2$ and $n_3$, are identical or different from each other, each independently chosen from an integer which value is from 1 to 10, and the sum $n_1+n_2+n_3$ ranges from 3 to 9, and
  p is 1 or 2.

15. The process according to claim 1, wherein the compound of formula (1) possesses the following characteristics:
- $R_1$ represents a straight or branched hydrocarbon group containing from 12 to 22 carbon atoms, optionally containing one or more insaturation(s), in the form of double and/or triple bond(s),
- $A_1$ represents a straight or branched alkylene group having from 2, 3 or 4 carbon atoms,
- $E_1$, $E_2$ and $E_3$, are identical or different from each other, each independently chosen from among an OE group and an OP group,
- $n_1$, $n_2$ and $n_3$, are identical or different from each other, each independently chosen from an integer which value is from 1 to 10, and the sum $n_1+n_2+n_3$ ranges from 3 to 9, and
- p is 1.

16. The process according to claim 1, wherein the compound of formula (2) possesses the following characteristics:
- $R_{22}$ and $R_{23}$ are identical or different from each other, each independently chosen from among hydrocarbon groups containing from 1 to 4 carbon atoms,
- $R_{24}$ represents hydrogen,
- $A_2$ represents an alkylene group having 1, 2, 3 or 4 carbon atoms, and
- q is 1 or 2.

17. The process according to claim 1, wherein the compound of formula (2) possesses the following characteristics:
- $R_{22}$ and $R_{23}$ are identical or different from each other, each independently chosen from among methyl, ethyl, propyl and butyl,
- $R_{24}$ represents hydrogen,
- $A_2$ is ethylene or propylene, and
- q is 1.

18. The process according to claim 1, wherein the collector agent of step b) consists of one or more compounds of formula (1) or consist of one or more compounds of formula (2).

19. The process according to claim 1, wherein the aqueous suspension obtained in step c) has a pH from 7 to 12.

20. The process according to claim 1, wherein the aqueous suspension obtained in step c) has a pH from 7.5 to 11.

21. The process according to claim 1, wherein the aqueous suspension obtained in step c) has a pH from 8.5 to 9.5.

22. The process according to claim 1, wherein the collecting agent is added in step c) in an amount of from 5 to 5000 ppm based on the total dry weight of the white pigment and impurities containing material of step a).

23. The process according to claim 1, wherein the collecting agent is added in step c) in an amount of from 30 to 1000 ppm, based on the total dry weight of the white pigment and impurities containing material of step a).

24. The process according to claim 1, wherein the aqueous suspension obtained in step c) has a solids content of between 5 and 80 wt.-%, based on the total weight of the solids in the suspension.

25. The process according to claim 1, wherein the aqueous suspension obtained in step c) has a solids content of between 20 and 60 wt.-%, based on the total weight of the solids in the suspension.

26. The process according to claim 1, wherein the collecting agent is present in the aqueous suspension obtained in step c) in an amount of from 0.01 to 10 wt.-%, based on the total weight of the solids in the suspension.

27. The process according to claim 1, wherein the collecting agent is present in the aqueous suspension obtained in step c) in an amount of from 0.1 to 3 wt.-%, based on the total weight of the solids in the suspension.

28. The process according to claim 1, wherein one or more additives are added to the aqueous suspension prior to, during or after step c), wherein the additives are selected from the group consisting of pH-adjusting agents, solvents, depressants, polyelectrolytes, frothers and collector agents other than the collector agents according to formula (1) or formula (2).

29. The process according to claim 1, wherein the aqueous suspension obtained in step c) is ground during and/or after step c).

30. The process according to claim 1, wherein the gas in step d) is air.

31. The process according to claim 1, wherein the suspension in step d) has a temperature of between 5 and 90° C.

32. The process according to claim 1, wherein the suspension in step d) has a temperature of between 20 and 50° C.

33. The process according to claim 1, wherein the white pigment bearing phase obtained from step e) is dispersed and/or ground before and/or after step e), optionally in the present of at least one dispersing agent and/or at least one grinding aid agent.

* * * * *